United States Patent [19]
Johansson

[11] 4,289,663
[45] Sep. 15, 1981

[54] METHOD OF PRODUCING SYNTHETIC RESIN FROM WASTE PRODUCTS

[75] Inventor: Ingvar K. G. Johansson, Kungsängen, Sweden

[73] Assignee: Svenska Traforskningsinstitutet, Stockholm, Sweden

[21] Appl. No.: 17,077

[22] Filed: Mar. 2, 1979

[30] Foreign Application Priority Data

Mar. 2, 1978 [SE] Sweden .............................. 7802393

[51] Int. Cl.³ ............................................. C08L 97/00
[52] U.S. Cl. ........................................ 260/17.5; 260/9
[58] Field of Search .................. 162/161, 163, 164 R, 162/165; 260/17.5, 124 R, 9

[56] References Cited

U.S. PATENT DOCUMENTS

| 1,750,903 | 3/1930 | Phillips | 260/17.5 |
|---|---|---|---|
| 1,838,109 | 12/1931 | Richter | 162/16 |
| 1,932,255 | 10/1938 | Sherrard et al. | 260/17.5 |
| 2,585,977 | 2/1952 | Uschmann | 260/17.5 |
| 2,849,314 | 8/1958 | Goss | 162/163 |
| 3,138,555 | 6/1964 | King et al. | 260/124 R |
| 3,148,177 | 9/1964 | Wiley et al. | 260/124 R |
| 3,819,812 | 6/1974 | Toivonen et al. | 162/16 |
| 3,957,703 | 5/1976 | Ludwig et al. | 260/124 R |
| 4,193,814 | 3/1980 | Shen | 260/124 R |

OTHER PUBLICATIONS

*Adhesives Age,* Feb. 1976, 33.

*Primary Examiner*—Peter Chin

[57] ABSTRACT

A method of producing synthetic resins from waste products containing lignin derivatives and sugars, especially waste liquors from cellulose pulp manufacture, is disclosed. The synthetic resins thus produced are especially utilizable as binders in chipboard, plywood, mineral wool slabs and the like. The method comprises treating the waste product in a first step so as to convert a substantial portion of the sugars contained therein into furfural derivatives. In a second step said furfural derivatives are condensed with the lignin to form a synthetic resin.

6 Claims, No Drawings

METHOD OF PRODUCING SYNTHETIC RESIN FROM WASTE PRODUCTS

The present invention relates to a new method of producing synthetic resin from waste products containing lignin or lignin derivatives and sugars, especially waste liquors from the sulphite industry. A particular object of the invention is to produce products which are utilizable as binders in chipboard, plywood, mineral wool slabs and the like.

In general, the method in accordance with the invention consists in that a sugar-containing product, which possibly also contains lignin, is processed in a first step so that a substantial portion of the sugar present is converted to furfural derivatives, and that in a second step these furfural derivatives are condensed with lignin or lignin derivatives, initially part of the product, or mixed therewith, to a synthetic resin.

The invention primarily relates to using sulphite waste liquor as starting material, and in the following it is mainly described in conjunction therewith.

Sulphite waste liquor has been previously tried as glue for chipboard, e.g. in the so-called Pedersen process (Danish Pat. No. 100 984). According to this process, which gives weather-proof boards of very good quality, the chips are coated with sulphite liquor, whereafter hardening takes place in two steps, first heat-pressing and then heating up in an autoclave for a relatively long time (1-2 hours). The process will thereby become complicated and time-consuming to carry out on an industrial scale. Large problems with corrosion caused by liberated sulphur dioxide in the autoclaves have been reported.

In another method, sulphite liquor and sulphuric acid have been used as glue, above all for so-called waferboard. According to this method (Forest Products Journal 24 (1974) 2, 38) the chip material is first sprayed with a 15 to 20% solution of sulphuric acid. Sulphite liquor powder is then mixed with the acidified chip material. Hardening takes place in a hot press only, and industrially acceptable pressing times and temperatures are used. The method is said to have good economy and give good strength characteristics to the board material. In a further development of this process (Adhesives Age, February 1976, 33) the sulphite liquor is first acidified with sulphuric acid to a pH of 0.1-0.3, after which it is spray dried. The acidified sulphite liquor powder is then used as glue for chipboard. Good board properties have been achieved here as well, under acceptable production conditions. The low pH used in hardening the boards results in that the process must be severly questioned, however, with regard to corrosion in the press and in metal fastenings used in conjunction with the finished boards. There is similarly the danger of the boards having impaired lifetime duration properties.

The experiences of the work already done is thus that chipboards of very good quality can be produced with practically only sulphite liquor as glue. Unrealistically time-consuming process conditions and/or corrosion problems are serious disadvantages which probably counteract the practical application of these processes.

Sulphite waste liquor (dry content generally 12-16%) consists to about 50% of ligno-sulphonates and to about 30% of sugars (as well as smaller amounts of extractive substances, organic acids, etc.). The ligno-sulphonates cannot condense with themselves to synthetic resins of acceptable quality. On the other hand, they can condense with aldehydes to phenoplastics—like products. See for example the Swedish Patent Application No. 7506833-8, where a solution of formaldehyde in phenol is used to cross-bond the lignin. Sugars, above all pentoses, are converted on heating to furfural derivatives, above all in a strongly acidic environment, i.e. aldehydes which can condense the lignin. With the greatest probability, this is what takes place in the previously described processes, where chips coated with sulphite liquor are heated either for a long time or under heavily acidic conditions. The sugar is dehydrated to furfural derivatives which then condense with the lignin. During heating, the sulphonic acid groups, which are not so heavily linked to the lignin, are split off. This gives sulphur dioxide and corrosion problems as a result.

In accordance with the present invention, it has been found that if the sugars of the sulphite liquor are converted to furfural derivatives before the liquor is used as glue, the disadvantages of the previously known processes are removed. Acceptable chipboard can be produced during short press times and without corrosion problems.

The conversion of the sulphite waste liquor sugars to furfural derivatives suitably takes place by the possibly somewhat evaporated liquor (15-30%) is acidified to a pH of 0.1-2.0 and heated, e.g. to 70°-180° C. for 5-60 minutes, preferably at 80°-100° C. for 20-60 minutes. To increase the furfural yield, other sugar-rich, primarily pentose-rich waste products can be added to the sulphite liquor before heating. Examples of such waste products are molasses, ground straw and bagasse. During heating, loosely bonded sulphonic acid groups are split off from the lignin and are given off as sulphur dioxide.

Before being used as glue of synthetic resin, the pH of the liquor can be raised to 1.0-4.0 to avoid a pH which is too low in the finished product, and its dry content can be increased to 50-60% by evaporation. To further reinforce the cross-linking possibilities of the sulphite liquor glue, further chemicals, which can condense with the lignin, may be added. Examples of such chemicals are 5-15% furfural or 5-25% of a solution of formaldehyde in phenol.

In producing chipboard with the sulphite liquor glue thus produced, the chips are coated with liquor of 10-20% dry weight, whereafter the chips are formed into sheets and pressed into boards at 150°-200 C., 1.5-2.5 MPa and a pressing time of 8-15 s/mm (calculated on the final board thickness).

The synthetic resin product based on sulphite waste liquor described here can be used, apart from glue for chipboard, plywood and similar wood products, in forming compositions for producing formed goods by pressing and similar methods, usually used for producing setting plastic products.

Instead of starting with sulphite waste liquor, other sugar-containing waste products can be used, such as molasses, whey, straw or thresher waste, which do not contain lignin or only contain minor amounts thereof, the sugar being converted to furfural and lignin added in the form of sulphate lignin or ligno-sulphonate, for example, so that a suitable ratio is obtained. The mixture can then be used as glue, raw plastics product or the like. Processing the sugar-containing product for conversion to furfural can here be done in the same way as described in conjunction with sulphite waste liquor.

Conversion of the sugar content of the starting material into furfural is preferably taken so far that substantially all the included sugar is converted to furfural. A lower degree of conversion, e.g. in the order of magnitude of 25-75% of the amount of sugar, can be satisfactory in some cases, however.

The invention is illustrated by the following working examples:

EXAMPLE 1

15% sulphite liquor (Ca-base) was acidified with $H_2SO_4$ to a pH of 0.3 and heated at 90° C. for 30 minutes, most of the sugar being converted to furfural derivatives. Precipitated gypsum was filtered off and the filtered liquor was evaporated to a dry content of about 55%. The liquor pH was increased to 1.0, whereafter chips were coated with 10% (dry glue on dry chips) of the evaporated liquor, formed into sheets and pressed at 180° C., 2 MPa for 5 minutes. 10 mm boards of acceptable quality were obtained.

EXAMPLE 2

30% sulphite liquor (Na-base) was acidified with HCl to pH 0.3 and heated to 80° C. for 40 minutes, most of the sugar being converted to furfural derivatives. The liquor was evaporated to a dry content of about 52%. The pH of the liquor was increased to 1.5 using $NH_3$ and 5% furfural, calculated on the dry sulphite liquor, was added. Chips were coated with 10% of this sulphite liquor glue, formed into sheets and pressed at 200° C., 2 MPa for 4 minutes. 10 mm boards of good quality were obtained.

EXAMPLE 3

15% sulphite liquor (Mg-base) was acidified with sulphuric acid to pH 0.4 and heated at 80° C. for one hour, most of the sugar being converted to furfural derivatives. The pH of the liquor was increased to 2.0 using $NH_3$, whereafter it was evaporated to a dry content of 55%. 10% of a phenol formaldehyde solution (phenol/formaldehyde: 2/1) calculated on dry sulphite liquor was added, whereafter chips were coated with the glue and pressed as in the previous examples. Boards of good quality were obtained.

EXAMPLE 4

16% sulphite liquor (Mg-base) was acidified with $H_2SO_4$ to a pH of 0.3 and heated in an autoclave at 120° C. for 30 minutes, substantially all the sugar being converted to furfural derivatives. The pH of the liquor was increased to 1.2 using $NH_3$, whereafter it was evaporated to a dry content of 50%. Veneers were coated with glue and pressed together at 150° C., and 0.8 MPa for 5 minutes. Plywood of good quality was obtained.

EXAMPLE 5

34% sulphite liquor (Mg-base) was acidified with $H_2SO_4$ to a pH of 0.6 and heated in an autoclave at 160° C. for 30 minutes. The pH of the liquor was increased to 1.2 using NaOH and was thereafter evaporated to a dry content of 50%. 10% of a phenol-formaldehyde solution (phenol/formaldehyde: 2/1) calculated on dry sulphite liquor was added together with wheat flour as a "filler". Veneer was coated with glue and pressed together at 150° C., and 0.8 MPa for 5 minutes. Plywood of good quality was obtained.

I claim:

1. A method for producing an adhesive for wood products comprising the steps of:
    (a) heating a waste product containing sugar in a strongly acidic environment at a pH of from 0.1 to 2.0 to produce a reaction mixture containing furfural derivatives, and
    (b) reacting said reaction mixture at a pH in the range of from 1.0 to 4.0 and at a solids content of from about 50 to 60%, without separating furfural therefrom, with lignin to form an adhesive binder containing the condensation products of said lignin and said furfural derivatives.

2. A method for producing an adhesive for wood products comprising the steps of:
    (a) heating a waste product containing sugar and lignin in a strongly acidic environment at a pH of from 0.1 to 2.0 to produce a reaction mixture containing furfural derivatives, and
    (b) reacting the furfural derivatives and lignin in said reaction mixture at a pH in the range of from 1.0 to 4.0 and at a solids content of from about 50 to 60% to form an adhesive binder containing the condensation products of said lignin and said furfural derivatives.

3. The method of claim 2 wherein said waste product comprises sulfite waste liquor.

4. The method of claims 1, 2 or 3 wherein said waste product is concentrated to about 15 to 30% solids prior to said heating.

5. The method of claims 1, 2 or 3 wherein pentose-rich products are added to said waste product prior to said heating to increase the furfural yields.

6. The method of claims 1, 2 or 3 wherein a further material capable of condensation with said lignin is added to said reaction mixture prior to said reacting.

* * * * *